June 22, 1965 J. H. POSTLEWAIT ETAL Re. 25,810

REEL TYPE LAWN MOWER

Original Filed June 29, 1960 2 Sheets-Sheet 1

INVENTORS
JAMES H. POSTLEWAIT, JAMES R. ROOT &
BY EDWARD H. GARNETT
Fishburn & Gold
ATTORNEYS.

June 22, 1965 J. H. POSTLEWAIT ETAL Re. 25,810

REEL TYPE LAWN MOWER

Original Filed June 29, 1960

2 Sheets-Sheet 2

INVENTORS
JAMES H. POSTLEWAIT, JAMES R. ROOT &
EDWARD H. GARNETT
BY
Fishburn & Gold
ATTORNEYS United States Patent Office Re. 25,810
Reissued June 22, 1965

25,810

[LAWN MOWER] *REEL TYPE LAWN MOWER*

James H. Postlewait, 5015 W. 69th St. Terrace, Prairie Village, Kans.; Edward H. Garnett, 6721 Brook Lane, Raytown, Mo.; and James R. Root, 3412 Norton, Independence, Mo.

Original No. 3,068,632, dated Dec. 18, 1962, Ser. No. 39,526, June 29, 1960. Application for reissue Dec. 17, 1963, Ser. No. 342,581
5 Claims. (Cl. 56—26)

Matter enclosed in heavy brackets [ ] appears in the original patent but forms no part of this reissue specification; matter printed in italics indicates the additions made by reissue.

This invention relates to reel type lawn mowers in which a stationary cutter bar is omitted, and more particularly to a lawn mower of this type wherein the reel includes at least one elongated cutter which contacts the grass to sever the top therefrom.

The principal objects of this invention are: to provide a mower for cutting grass or the like having a horizontally disposed rotating reel composed of thin walled tubing having at least one cutter on the outer surface thereof; to provide a high speed vegetation cutting reel having relatively short cutting legs which extend obliquely toward the direction of rotation of the reel causing air currents which lift the grass before cutting and exhausts cut grass rearwardly of the mower; to provide such a reel having a plurality of cutters each comprising an elongated angle having an anchoring leg secured to the reel body and a cutting leg terminating in a sharp edge parallel to and spaced from said body; to provide such a reel in which the anchoring leg and the cutting leg of the cutters make an angle of approximately 158° with each other; to provide such a mower having the cutting edges of the reel so positioned that a lawn may be trimmed closely adjacent a vertical obstruction; to provide such a reel which permits unusually neat and tidy lawn care; to provide a lawn mower which is safe in operation, is highly efficient in spreading the leaves and grass evenly behind the mower after cutting thereof, requires low power to operate, is very difficult to clog and is inexpensive to produce, easy to maintain, quiet running and reliable in operation.

Other objects and advantages of this invention will become apparent from the following description taken in connection with the accompanying drawings wherein are set forth by way of illustration and example certain embodiments of this invention.

Figure 1:
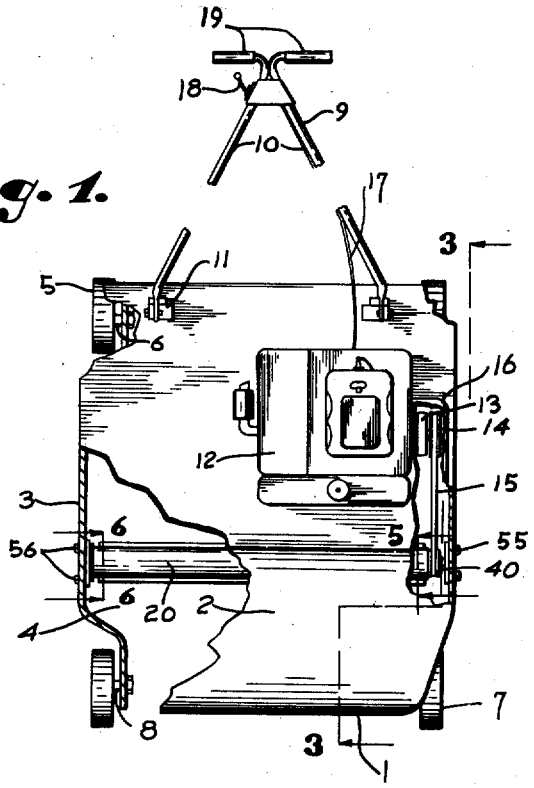
FIG. 1 is a fragmentary plan view of a lawn mower embodying this invention partially broken away.
Figure 2:
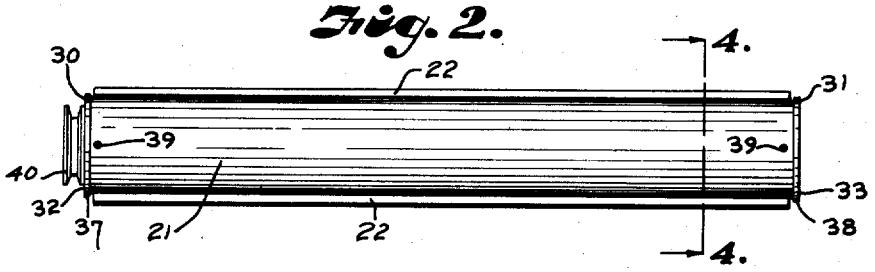
FIG. 2 is an enlarged detail view showing the cutting reel of this invention.

Referring more in detail to the drawings:

1 designates the housing or frame of the lawn mower. The housing 1 has a top 2, depending sides 3, a substantially open bottom 4 and an open forward end 4'. The housing 1 is provided with a pair of rear wheels 5 rotatably supported on shafts 6 secured to the housing 1, and a pair of front wheels 7 rotatably supported on shafts 8 secured to the housing 1. The lawn mower is equipped with the usual handle 9 provided with side members 10 hingedly secured by brackets 11 to the housing top 2.

A power plant is secured to the top 2 of the housing 1 and in the embodiment shown is a gasoline engine 12. The gasoline engine 12 is designed to drive a cutting reel, described hereinafter, through a centrifugal clutch 13, a pulley 14 and a drive belt 15. The centrifugal clutch 13 is the well known type adapted to disengage at starting or idling speeds of the gasoline engine 12, such as disclosed in Patent No. 2,633,956. A pulley cover 16 is provided to cover the exposed portions of the clutch 13, pulley 14 and belt 15. An engine speed control cable 17 is suitably secured to the handle 9 and terminates at a speed control lever 18 conveniently located near the handle grips 19.

Figure 3:
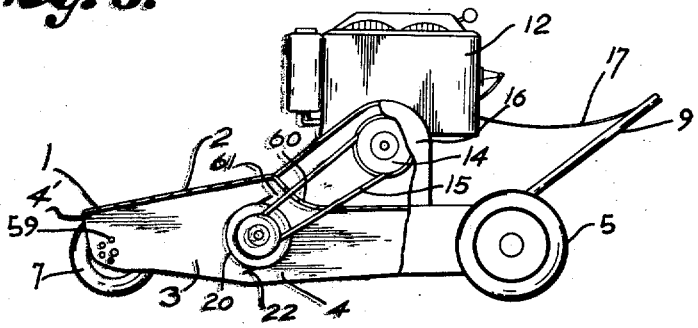
FIG. 3 is a partially sectional view taken on the line 3—3, FIG. 1, showing the mower in side elevation.

A cutter reel designated generally by the reference numeral 20 is located between the depending sides 3 and slightly forward of the center of the housing top 2. The reel 20 is horizontally disposed and is comprised of an elongated, thin walled tube 21 having a pair of oppositely disposed cutters 22 on the outer surface thereof. Each of the cutters 22 has a substantially constant cross section throughout it length and is composed of an elongated angle having an anchoring leg 23 and a cutting leg 24. In this example the anchoring legs 23 are secured to the outer surface 25 of the tube 21 by suitable means such as spot welds 26. The anchoring legs 23 are secured to the outer surface 25 in parallel relation to the axis of the tube 21. The cutting legs 24 make an angle of approximately 158° with the anchoring legs 23 or said legs 24 extend at an angle in the nature of 22° to a plane tangent to the rotor surface at the line of departure of the respective blade and said angle appears to produce optimum cutting. Variations of the angle between the cutting legs 24 and anchoring legs 23 from approximately 135° to 160° have been found to be satisfactory. The cutting legs 24 terminate in sharp edges 27 which are also parallel to the axis of the tube 21 and are spaced from the outer surface 25. The sharp edges 27 extend longitudinally substantially the length of the tube 21 and point obliquely toward the direction of rotation of the tube 21, which is clockwise as seen in FIG. 3. The sharp edges 27 are formed by grinding or otherwise machining the cutting leg 24 so that the surfaces 28 intersect the leading side 29 of the cutting leg 24. The surfaces 28 are respectively in planes substantially tangent to the outer surface 25 of the tube 21 rearwardly of the sharp edges 27.

The ends 30 and 31 of the tube 21 are closed by means of mounting disks 32 and 33. The disks 32 and 33 respectively exhibit annular outside surfaces 34 and 35 which are of a diameter which permits a snug fit against the inner surface 36 of the tube 21. The disks 32 and 33 also exhibit annular shoulders 37 and 38 which abut against the ends 30 and 31 of the tube 21 to squarely position the disks 32 and 33 thereon. Suitable fastening means such as screws 39 extend through the tube 21 and into the disks 32 and 33 to secure the reel assembly and prevent relative movement between the disks and the tube. The mounting disk 32 has formed integral therewith a pulley 40 which extends outwardly from the tube end 30 and carries the drive belt 15. The disks 32 and 33 respectively contain aligned, central, annular bores 41 and 42 and slightly longer aligned annular bores 43 and 44 which face outwardly of the tube ends 30 and 31 respectively. Shoulders 45 and 46 are formed between the bores 41 and 43 and the bores 42 and 44 providing seats for ball bearings 47 and 48.

Aligned rods or studs 49 and 50 project inwardly of the depending walls 3 and are respectively inserted in the inner race of the bearings 47 and 48, mounting the reel 20 in the mower housing. The studs 49 and 50 are carried in canti-lever fashion in blocks 51 and 52 by means of welds 53 and 54 and the blocks 51 and 52 are securely mounted to the depending walls 3 by means of bolts 55 and 56. Washers 57 and 58 are respectively positioned between the bearings 47 and 48 and the blocks 51 and 52 to prevent excess lateral shifting of the reel 20. It is noted that the reel 20 and the parts related thereto may be easily removed from the mower by merely unscrewing the bolts 55 and 56 and allowing the reel 20 and the parts related thereto to drop downwardly from the mower housing.

In the embodiment shown, two cutters 22 form the cutting members of the reel 20. It has been found that the cutters 22 offer unexpectedly rapid and clean grass cutting properties in heavy-bodied, light-bodied, wet or dry grasses with very low power requirements. Satisfactory operating speeds of the reel 20 occur over a rather extended range. However, 4500 r.p.m. using a three inch diameter tube and one-half inch high cutting legs has been found to be highly satisfactory for most purposes. The centrifugal clutch 13 of the type shown in Patent No. 2,633,956 is adjusted under such conditions to engage at 2500 to 2800 r.p.m. in order that the reel will not turn at starting and idling speeds of the engine. If desired, the centrifugal clutch may be eliminated without impairing the cutting properties of the mower.

The mower constituting this invention exhibits safety in operation. The reel 20 is positioned close to the center of the housing 1, well removed from the front and back, making it virtually impossible to trap the user's or spectator's foot therein, since the angle will be contacted before the toes reach the reel and the depending sides 3 prevent foot access from the sides of the housing. It is noted that in case of upset or if a limb or object is accidently thrust into the spinning reel in spite of its recessed position, the short distance between the sharp edge 27 and the outer surface 25 of the tube will tend to minimize the damage. Debris contacted by the cutter reel has been thrown harmlessly against the inside surface of the housing 1 in all observed cases.

The housing may be changed to various distances above the ground to control the height of cut of the grass. One means of doing this is by providing a series of staggered mounting holes 59 for each wheel shafts 6 and 7, the holes 59 each being at a different level with respect to the sides of the housing 1, FIG. 3. Thus to raise the reel 20 a greater distance from the ground, a lower shaft supporting hole 59 is chosen for either the shafts 8 of the front wheels 7, the shafts 6 of the rear wheels 5, or both sets of shafts.

The mower of this invention has been found to act as a spreader of the grass and leaves under the mower housing as it cuts. This spreading operation is highly efficient. It has also been found that this invention will not windrow the grass, that is, will leave practically no indication of the cutting paths taken by the mower. It is very difficult to clog the mower since there are no close clearances between a stationary edge and a cutting edge. The termination of the cutting legs 24 close to one depending side 3 of the housing 1 permits very small trimming clearances so that grass may be cut closely adjacent to a vertical wall or obstruction which otherwise could not be reached by the mower.

Figure 4:
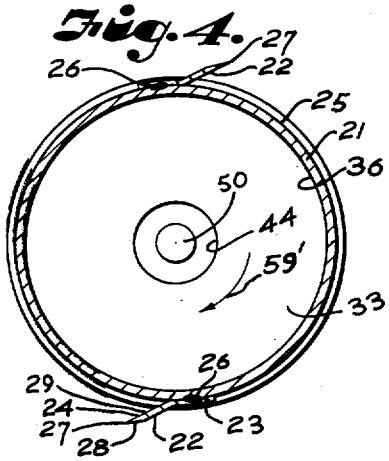
FIG. 4 is an enlarged sectional view of the cutting reel taken on the line 4—4, FIG. 2, showing the cutters in detail.
Figure 5:
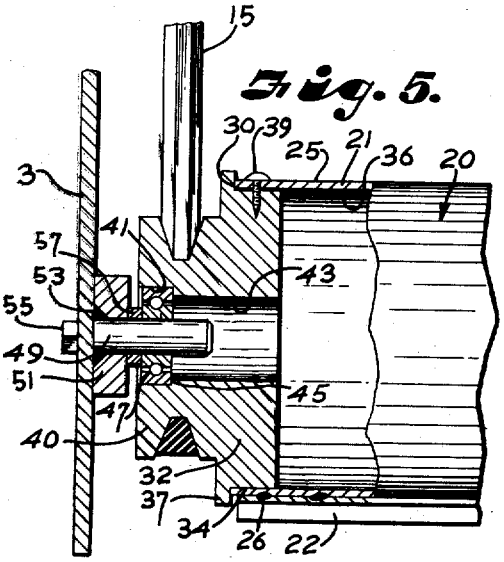
FIG. 5 is an enlarged sectional view taken on the line 5—5, FIG. 1, showing the mounting of the driven end of the cutting reel.
Figure 6:
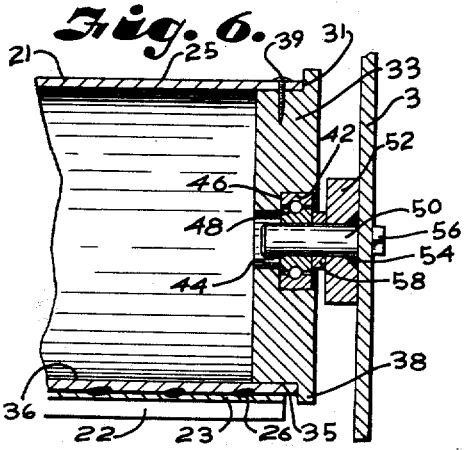
FIG. 6 is a sectional view taken on the line 6—6, FIG. 1, showing the mounting of the following end of the cutting reel.

The arrow 59' (FIG. 4) indicates direction of rotation of the reel 20. It has been found that the short, oblique cutting legs 24 cooperate with the cylindrical surface of the tube 21 to create an upward air current immediately forwardly of the tube and a low pressure area under the housing 1 forwardly thereof to lift the grass ends upwardly into the cutting legs 24. The top 2 of the housing 1 is sloped downwardly above and slightly to the rear of the reel 20 as indicated at 60 (FIG. 3) forming a reduced passageway 61 to exhaust cut grass rearwardly of the reel 20 and to the rear of the mower, producing a smooth, even, manicured appearance, unlike lawn mowers which operate from a vertical shaft wherein the center portion of the rotor does not cut but rather merely beats down the grass, preventing even cutting by the outer edges of the rotor.

It is to be understood that while we have illustrated and described one form of our invention, it is not to be limited to the specific form or arrangement of parts herein described and shown except insofar as such limitations are included in the claims.

What we claim and desire to secure by Letters Patent is:

[1. A lawn mower comprising, a housing having depending side walls, supporting rollers connected to said housing within the lateral confines of said side walls, a cylinder-type cutter member supported on a horizontal axis entirely within said housing, and said housing being provided with an upwardly extending pocket having a downwardly extending rear portion to provide a reduced passageway between the cutter and the housing for the passage of cut grass.]

[2. A lawn mower as defined in claim 1 wherein the cylinder-type cutter has a peripheral surface and a plurality of cutter blades integrally joined thereto in circumferentially spaced relation with said blades each having flat portions extending in the direction of rotation and at an acute angle to a plane tangent to said peripheral surface at a line of departure of the respective blades.]

[3. A lawn mower as defined in claim 2 wherein said depending side walls each terminate in a bottom edge spaced below the level of the cut of said cutter blades for substantially the length of the housing to prevent contact of said blades with objects extending inwardly under the housing side walls from exteriorly thereof.]

[4. A lawn mower as defined in claim 3 wherein said housing is elongate with a top wall having a front end and a rear end, said front end of the top wall and side walls defining a front end opening, said top wall being substantially flat and inclined upwardly and rearwardly to said upwardly extending pocket, said top wall being of such length from the cutter to said front end and rear end respectively to form a guard against contact of the cutter blades with a person's foot extending inwardly from said front and rear ends.]

[5. A lawn mower as defined in claim 4 wherein said flat portions of the blades each extend in the direction of rotation at an angle in the nature of 22 degrees to a plane tangent to the peripheral surface of the cutter at the line of departure of the respective blade.]

*6. A lawn mower comprising, a housing having a top wall and side walls depending from the top wall, the top wall having an upwardly inclining portion and an adjoining downwardly and rearwardly declining portion together forming a transversely extending pocket in the housing top wall, a cylinder type cutting reel mounted in the housing adjacent the pocket for rotation about a horizontal axis normal to the direction of forward movement of the mower, the reel having a continuous peripheral surface with cutter blades circumferentially spaced and extending outwardly from the cylinder and along the full length thereof, and means to rotate the reel so as to move the top of the cylinder counter to the direction of movement of the mower, the pocket-forming portions of the housing top wall and the cylinder forming between them a passageway of venturi-shaped vertical cross-section, the passageway having an entrance throat of vertically converging cross-section through which air currents induced by movement of the reel cutter blades through the passageway will pass to create an area of reduced air pressure within the housing forwardly of the reel in the direction of movement of the mower to lift grass into the path of the reel cutter blades, and the passageway having a discharge throat of vertically diverging cross-section to provide a discharge of progressively increasing area to allow free flow of cut grass out of the passageway.*

*7. A lawn mower as claimed in claim 6 wherein, there are rollers mounted on the housing, the rollers being posi-*

*tioned so they do not project beyond the widest expanse of the housing.*

*8. A lawn mower as claimed in claim 7 wherein, said cutter blades are in circumferentially spaced relation about the cylinder, with said blades each having flat portions extending from the cylinder in the direction of rotation of the cylinder at acute angles to planes tangent to the cylinder surface at the lines of departure of the respective cutter blades.*

*9. A lawn mower as claimed in claim 8 wherein, the depending side walls of the housing each terminates in a bottom edge spaced below the level of the cut of the cutter blades for substantially the length of the housing to prevent contact of the cutter blades with objects extending inwardly under the housing side walls from exteriorly thereof.*

*10. A lawn mower as claimed in claim 9 wherein, the housing is elongate and has a front end and a rear end, the housing being of such length from the reel to the front end and from the rear end to the reel as to form a guard against contact of the cutter blades with a person's foot extending inwardly from the front and rear ends of the housing.*

References Cited by the Examiner

The following references cited by the Examiner are of record in the patented file of this patent or the original patent.

UNITED STATES PATENTS

| | | | |
|---|---|---|---|
| 2,236,612 | 4/41 | Stoner | 56—294 |
| 2,507,247 | 5/50 | Davis et al. | 56—289 |
| 2,521,262 | 9/50 | Smith | 56—294 |
| 2,696,705 | 12/54 | Greber | 56—26 |
| 2,734,328 | 2/56 | Wood | 56—26 |
| 2,734,538 | 2/56 | Wallingford. | |
| 2,794,310 | 6/57 | Galloway | 56—294 |
| 2,851,843 | 9/58 | Levkoff | 56—294 |
| 2,869,309 | 1/59 | Benson | 56—294 |
| 2,923,117 | 2/60 | Henderson | 56—294 |

FOREIGN PATENTS

| | | |
|---|---|---|
| 772,194 | 4/57 | Great Britain. |

ABRAHAM G. STONE, *Primary Examiner.*

ARNOLD RUEGG, ANTONIO F. GUIDA, T. GRAHAM CRAVER, *Examiners.*